United States Patent [19]

Hiramatsu et al.

[11] Patent Number: 5,065,317

[45] Date of Patent: Nov. 12, 1991

[54] LANGUAGE LABORATORY SYSTEMS

[75] Inventors: Tamihei Hiramatsu, Kanagawa; Yoshiko Matsushita, Tokyo, both of Japan

[73] Assignee: Sony Corporation, Tokyo, Japan

[21] Appl. No.: 528,230

[22] Filed: May 24, 1990

[30] Foreign Application Priority Data

Jun. 2, 1989 [JP] Japan ................................. 1-140703

[51] Int. Cl.5 .............................................. G09B 7/04
[52] U.S. Cl. .................................... 364/419; 434/157
[58] Field of Search ............... 381/43, 51, 52; 379/89, 379/84, 74; 434/351, 157; 364/419

[56] References Cited

U.S. PATENT DOCUMENTS

| | | | |
|---|---|---|---|
| 3,595,120 | 7/1971 | Martin | 84/470 |
| 4,238,893 | 12/1980 | Komatsubara | 434/351 |
| 4,310,317 | 1/1982 | Nomura | 434/319 |
| 4,371,752 | 2/1983 | Matthew | 379/89 |
| 4,573,140 | 2/1986 | Szeto | 364/900 |
| 4,609,358 | 9/1986 | Sangster | 434/307 |
| 4,737,110 | 4/1988 | Masuda | 434/350 |
| 4,747,126 | 5/1988 | Hood | 379/74 |
| 4,831,653 | 5/1989 | Katayama | 381/43 |
| 4,885,763 | 12/1989 | O'Brien | 379/67 |
| 4,916,726 | 6/1990 | Morley | 379/88 |

Primary Examiner—Dale M. Shaw
Assistant Examiner—Andrew Bodendorf
Attorney, Agent, or Firm—Philip M. Shaw, Jr.

[57] ABSTRACT

Individual training stations are able to record and play back a student's own pronunciations as well as to reproduce the recorded pronunciations of the fellow students and of prerecorded voice teaching aids by means of a digital memory and controller.

4 Claims, 3 Drawing Sheets

LANGUAGE LABORATORY SYSTEMS

FIELD OF THE INVENTION

The present invention generally relates to language laboratory systems in which students in a group are trained in hearing and speaking a selected language, and more particularly, is directed to improvements in a language laboratory system comprising a plurality of training apparatus for students, each of whom is provided with a voice input and output device and supplied with audible voice teaching aids.

DESCRIPTION OF THE PRIOR ART

A language laboratory system in which students in a group are trained in hearing and speaking a selected language is generally constituted with facilities including a plurality of training apparatus for the students, each of whom is provided with a headset having a microphone and a headphone mounted thereon as a voice input and output device, respectively, and an instructing apparatus for supplying each of the training apparatus with audible voice teaching aids. Each of the training apparatus usually contains a voice recording and reproducing device, such as a tape recorder, and is operative to record and play back the voice teaching aids from the instructing apparatus and further record the student's voice from the headset microphone and thereafter reproduce the student's recorded voice. Each of the students utilizing the language laboratory system operates the headset and the voice recording and reproducing device to practice hearing and speaking the selected language.

In such a prior art language laboratory system, each student practices pronunciation in the process of hearing the voice teaching aids through the headset and these practice pronunciations are supplied through the microphone of the headset to the tape recorder for causing them to be recorded and then played back in order to check the student's progress in mastering the language. Each student is prevented from listening to the pronunciations of the other practicing students using other training apparatus and can hear only the voice teaching aids and his or her own voice. Accordingly, it is impossible for each student to compare his or her own pronunciations with another student's pronunciations so as to evaluate his or her pronunciations with reference to the audible voice teaching aids. The result is that the students are given insufficient feedback for full utilization of the language laboratory's benefits.

OBJECTS AND SUMMARY OF THE INVENTION

Accordingly, it is an object of the present invention to provide a language laboratory system comprising a plurality of training apparatus for students, each of which is provided with a voice input and output device constituting an audio signal input portion and an audio signal output portion, respectively, for recording and reproducing audio signals, which avoids the aforementioned disadvantages encountered with the prior art.

Another object of the present invention is to provide a language laboratory system comprising a plurality of training apparatus for students, each of which is provided with a tape recorder/player for recording and reproducing audio signals, in which each student making use of one of the training apparatus is able to hear not only the student's own recorded and reproduced voice but also the recorded and reproduced voice of another student using a different training apparatus.

According to the present invention, there is provided a language laboratory system comprising a plurality of training apparatus each provided with an audio signal input portion and an audio output portion, a voice data producing device for producing voice information data based on an input audio signal supplied through the audio signal input portion provided in each of the training apparatus, and a voice memory device for storing the voice information data obtained from the voice data producing device in a storage area of the memory device as designated by address data. Further provided is an address data memory device for storing in storage areas thereof pairs of starting address data and terminating address data which designate respectively starting and terminating ends of each of the storage areas of the voice memory device in which the voice information data are stored. A memory controller is operative to read the pairs of starting address data and terminating address data successively from the storage areas of the address data memory device in response to a reproduction command signal sent out of one of the training apparatus and then to read the voice information data stored in the storage area of the voice memory device as designated by each of the pairs of starting address data and terminating address data read from the storage areas of the address data memory device. An audio signal supplying device produces an output audio signal based on each of the voice information data read from the storage area of the voice memory device and supplies the audio signal output portion of one of the training apparatus with the output audio signal produced based on the voice information data.

With the language laboratory system thus constituted in accordance with the present invention, each student making use of one of the training apparatus is able to selectively hear his or her own recorded and reproduced voice or that of another student using a different apparatus. In either case, the voice which is heard is based on an audio signal stored in and then read from the voice memory device through the training apparatus used by the student or by the other student.

The above, and other objects, features and advantages of the present invention will become apparent from the following detailed description which is to be read in conjunction with the accompanying drawings.

DESCRIPTION OF THE PREFERRED EMBODIMENT

Figure 1:
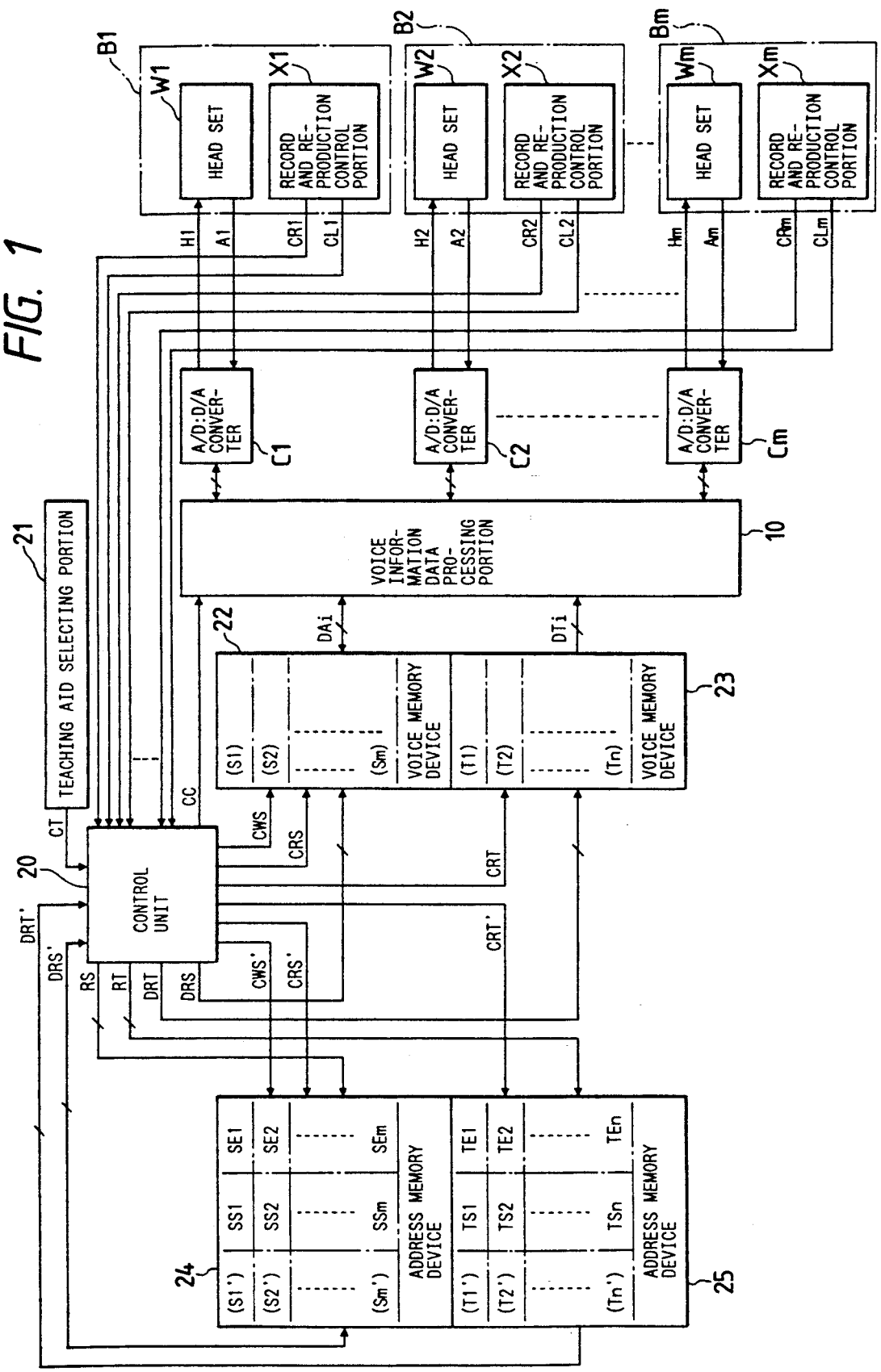
FIG. 1 is a schematic block diagram showing an embodiment of a language laboratory system according to the present invention.

Referring to FIG. 1, training apparatus B1, B2, ... Bm, totalling m units, are provided to have headsets W1, W2, ... Wm, each containing a microphone and a headphone (both of which are not shown) mounted thereon for constituting an audio signal input portion and an audio signal output portion, and record and reproduction control portions X1, X2, ... Xm, respectively. Separate headsets W1, W2, ... Wm are provided to each training apparatus B1, B2, ... Bm, respectively. These headsets are connected to corresponding analog to digital and digital to analog (A/D:D/A) converters C1, C2, ... Cm, respectively, for individually supplying them with input audio signals A1, A2, ... Am, respectively, and receiving from the A/D:D/A converters C1, C2, ... Cm output audio signals H1, H2, ... Hm, respectively.

Each of the A/D:D/A converters C1, C2, ... Cm is connected to a voice information data processing portion 10 and is operative to produce voice information data by digitizing the input audio signals A1, A2, ... Am received thereby, respectively, and supplying the voice information data processing portion 10 with the voice information digital data. Each of the A/D:D/A converters C1, C2, ... Cm further produces, respectively, the output audio signals H1, H2, ... Hm by converting the voice information digital data obtained from the voice information data processing portion 10 into corresponding voice information analog data.

The voice information data processing portion 10 is operative to produce memorizable voice information data DAi by causing the voice information data obtained from the each of the A/D:D/A converters C1, C2, ... Cm to be subjected to a predetermined processing and to supply a voice memory device 22 with the memorizable voice information data DAi. The voice information data processing portion 10 is further operative to receive the voice information data DAi read from the voice memory device 22 and teaching aid information data DTi read from another voice memory device 23.

The voice memory device 22 has a plurality of storing partitions S1, S2, ... Sm in a selected one of which different memorizable voice information data DAi obtained from the voice information data processing portion 10 is stored. Similarly, the voice memory device 23 has a plurality of storing partitions T1, T2, ... Tn in each of which different teaching aid information data DTi corresponding to predetermined voice teaching aids is stored. The storing partitions S1, S2, ... Sm of the voice memory device 22 are assigned to correspond to the training apparatus B1, B2, ... Bm, respectively.

The record and reproduction control portions X1, X2, ... Xm provided in the training apparatus B1, B2, ... Bm, respectively, are connected to supply a control unit 20 with separate record command signals CR1, CR2, ... CRm, respectively, or reproduction command signals CL1, CL2, ... CLm, respectively, in response to operations by students.

When one of the record command signals CR1, CR2, ... CRm having a predetermined level, for example, a level representing a logic "1" is supplied to the control unit 20, the control unit 20 stores the memorizable voice information data DAi obtained from the voice information data processing portion 10 in one of the corresponding storing partitions S1, S2, ... Sm of the voice memory device 22. The control unit 20 also stores in the address memory device 24 a pair of starting address data SS1 and terminating address data SE1, or starting address data SS2 and terminating address data SE2, ... or starting address data SSm and terminating address data SEm, which designate the starting and the terminating ends, respectively, of the corresponding storage areas of the storing partitions S1, S2, ... Sm, respectively, in which the memorized voice information data DAi is stored. For example, when the control unit 20 receives a record command signal CR1, the control unit 20 stores the memorizable voice information data DA1 obtained from the voice information data processing portion 10 in the corresponding storing partition S1 of the voice memory device 22. The control unit 20 also stores in an address memory device 24 a pair of starting address data SS1 and terminating address data SE1, of the corresponding storage areas of the storing partition S1 in which the memorized voice information data DA1 is stored.

On the other hand, when one of the reproduction command signals CL1, CL2, ... CLm having a predetermined level, for example, a level representing a logic "1" is supplied to the control unit 20, the control unit 20 reads one of the pairs of starting address data and terminating address data SS1 and SE1, SS2 and SE2, ... SSm and SEm from the address memory device 24 and, using these starting and terminating address data, the control unit 20 further reads the memorized voice information data DAi from the storage area in the storing partitions S1, S2, ... Sm of the voice memory device 22 which is designated by the read starting and terminating address data. Thereafter, the control unit 20 reads the memorized voice information data DAi from the storage area in the next one of the storing partitions S1, S2, ... Sm of the voice memory device 22 in the same manner as mentioned above and this reading operation is repeatedly conducted until the memorized voice information data DAi is read from the storing partition Sm of the voice memory device 22.

Further, the control unit 20 selectively receives a teaching aid designating signal CT from a teaching aid selecting portion 21. This causes the control unit 20 to read from an address memory device 25 in which they are stored, one of a pair of starting address data and terminating address data TS1 and TE1, TS2 and TE2, ... TSn and TEn. These designate, respectively, the starting and the terminating ends of the storing partitions T1, T2, ... Tn of the voice memory device 23. Stored in each of such storing partitions is the teaching aid information data DTi. Using the starting address data and terminating address data which have been read, the control unit 20 then reads the teaching aid information data DTi from the storage area in the storing partition which is so specified.

In this embodiment, the A/D:D/A converters C1, C2, ... Cm and the voice information data processing portion 10 together constitute a voice data producing device for producing the memorizable voice information data DAi based on the input audio signals A1, A2, ... Am and an audio signal supplying device for producing and supplying the output audio signals H1, H2, ... Hm to the training apparatus B1, B2, ... Bm.

The above operations will now be described in more detail. The subscript "i" will be used with the above reference designations to indicate any particular group of corresponding elements. For example, "CRi" designates one of the record command signals CR1, CR2, ... CRm and "CLi" one of the reproduction command signals CL1, CL2, ... CLm produced by training unit "Bi", which is one of the training apparatus B1, B2, ... Bm. "SSi" is one of the starting address data SS1, SS2, ... SSm for the storage area "Si", which is one of the storing partitions S1, S2, ... Sm, etc.

Memorizing Voice Data

When the signal CRi is supplied to the control unit 20 from the training apparatus Bi, the control unit 20 supplies the voice memory device 22 with a store command signal CWS and address data DRS. The address data DRS advances from a starting address SSi. Then, the control unit 20 supplies the voice information data processing portion 10 with a control signal CC so as to cause the voice information data processing portion 10 to produce the memorizable voice information data DAi based on the voice information data obtained from a A/D:D/A converter Ci.

When that happens, an input audio signal Ai is output from the training apparatus Bi and therefore the voice information data processing portion 10 so that the memorizable voice information data DAi produced by the voice information data processing portion 10 is stored in the storing partition Si of the voice memory device 22 continuously from the starting end thereof.

The record command signal CRi is stopped when the input audio signal Ai is terminated and has been completely stored in the form of the memorized voice information data DAi in the storing partition Si. The control unit 20 is operative to cause the final contents of the address data DRS to be stored as the termination address data SEi.

Then, the control unit 20 supplies the address memory device 24 with a store command signal CSW', address data RS designating a storing partition Si', which is one of a series of storing partitions S1', S2', ... Sm' of the address memory device 24 corresponding to the storing partition Si of the voice memory device 22, and address data DRS' containing the starting and terminating address data SSi and SEi, respectively, to be memorized. Thereafter the control unit 20 stops supplying the address memory device 24 with the store command signal CWS', the address data RS, and the address data DRS'. Instead, the control unit 20 supplies the voice memory device 22 with the store command signal CWS and the address data DRS and further supplies the voice information data processing portion 10 with the control signal CC.

Reproducing the Memorized Voice Data

To read previously memorized data, the control unit 20, in response to a reproduction command signal CLi having a level representing a logic "1" and which is supplied from the training apparatus Bi, reads from the address memory device 24 one of the pairs of respective starting address data and terminating address data SS1 and SE1, SS2 and SE2, ... SSm and SEm. The control unit 20 supplies the address memory device 24 with a read command signal CRS' and the address data RS designating the storing partition Si' of the address memory device 24. Then the control unit 20 reads the pair of starting and terminating address data SSi and SEi out of the storing partition Si of the address memory device 24 as the new address data DRS'. Further, the control unit 20 supplies the voice memory device 22 with a read command signal CRS and an address data DRS which is formed based on the address data DRS' to advance successively from the starting address data SSi to the terminating address data SEi.

This operation causes the memorized voice information data DAi to be read from the storage area which has the starting end and the terminating end designated respectively by the starting address data SSi and the terminating address data SEi in the storing partition Si of the address memory device 24. After that, the control unit 20 supplies the voice information data processing portion 10 with the control signal CC so as to cause the voice information data processing portion 10 to supply the A/D:D/A converter Ci with the voice information data obtained based on the memorized voice information data DAi read from the voice memory device 22. Thus, the data is one storage area is read and reproduced. It is sometimes necessary or desireable, however, to read one or more remaining storage areas, e.g. those assigned to the other training units.

When the memorized voice information data DAi has been read from the storage area of the storing partition Si of the voice memory device 22, the control unit 20 supplies the address memory device 24 with a read command signal CRS' and address data RS designating a storing partition Si+1' of the address memory device 24 and reads the pair of starting address data SSi+1 and terminating address data SEi+1 out of the storing partition Si+1 of the address memory device 24 as the new address data DRS'.

Then, the control unit 20 supplies the voice memory device 22 with a read command signal CRS and address data DRS, which is formed based on the address data DRS', to advance successively from the starting address data SSi+1 to the terminating address data SEi+1 so that the memorized voice information data DAi are read from the storage area which has the starting end and the terminating end designated respectively by the starting address data SSi+1 and the terminating address data SEi+1 in the storing partition Si+1 of the address memory device 24.

Such reading of the memorized voice information data DAi from the address memory device 24 is repeatedly conducted until the memorized voice information data DAi are read from the storage area which has the starting end and the terminating end designated respectively by the starting address data SSm and the terminating address data SEm in the storing partition Sm of the address memory device 24, i.e. the storage area corresponding to the last of the m training units. When the reading of the memorized voice information data DAi from the address memory device 24 has been finished, the control unit 20 stops supplying the read command signal CRS' and the address data RS to the address memory device 24, the read command signal CRS and the address data DRS to the voice memory device 22, and the control signal CC to the voice information data processing portion 10.

Reproducing Memorized Voice Teaching Aid Data

In response to a teaching aid designating signal CT supplied to the control unit 20 from the teaching aid selecting portion 21, the control unit 20 supplies the voice information data processing portion 10 with the control signal CC so as to cause the voice information data processing portion 10 to supply the A/D:D/A converter Ci with the voice information data which is to be obtained based on the teaching aid voice information data DTi to be read from the voice memory device 23. Then, the control unit 20 supplies the address memory device 25 with a read command signal CRT' and address data RT designating a storing partition Ti' which is one of storing partitions T1', T2', ... Tn' of the address memory device 25 corresponding to a storing partition Ti of the address memory device 23. The control unit 20 reads one of the pairs of respective starting address data and terminating address data TSi and TEi out of the storing partition Ti as the address data DRT'. After that, the control unit 20 stops supplying the address memory device 25 with the read command signal CRT' and the address data RT.

Further, the control unit 20 supplies the voice memory device 23 with a read command signal CRT and an address data DRT which is formed based on the address data DRT' to advance successively from the starting address data TSi to the terminating address data TEi. In this way the teaching aid information data DTi are read from the storage partition Ti, as designated by the starting address data TSi and the terminating address data TEi, of the voice memory device 23. After that, the control unit 20 stops supplying the voice information data processing portion 10 with the control signal CC and stops supplying the voice memory device 23 with the read command signal CRT and the address data DRT.

Program Flow for Storing Voice Data Information

Figure 2:
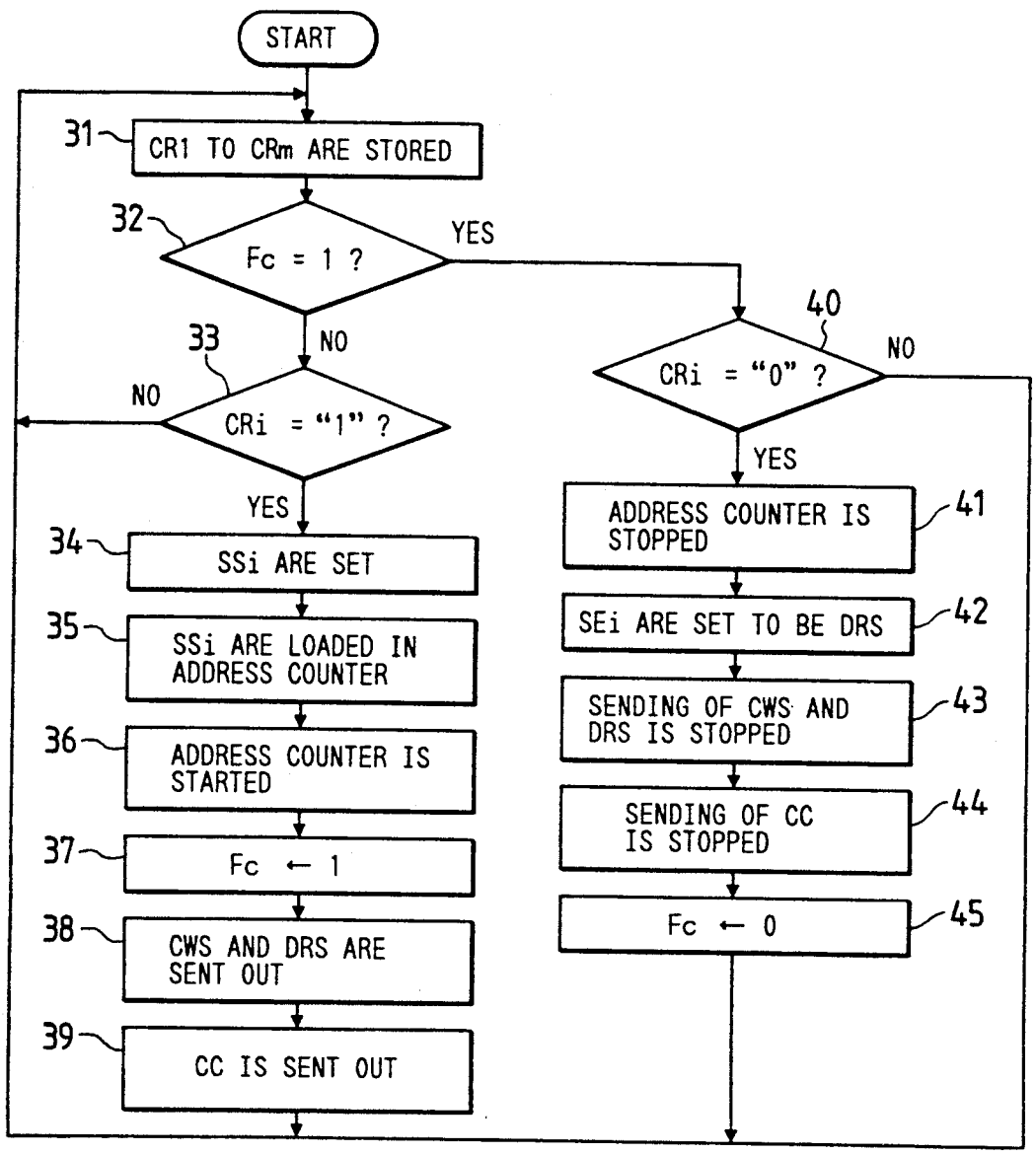
FIG. 2 is a flow chart used for explaining the operation performed by the embodiment shown in FIG. 1 when storing ("memorizing") voice data information.

The control unit 20 is constituted, for example, by a microcomputer (not shown). One example of an operation program for performing the control in response to the record command signal CRi by the microcomputer is illustrated in a flow chart shown in FIG. 2. First, in step 31, the record command signals CR1 to CRm obtained from the training apparatus B1 to Bm, respectively, are stored in a memory device (not shown) contained in the control unit 20. Next, in step 32, it is checked whether a flag Fc represents a logic "1" or not. When the flag Fc does not represent a logic "1", it is checked whether the record command signal Cri has a level representing a logic "1" or not, in step 33. As a result, when the record command signal CRi does not have a level representing a logic "1", the process returns to the step 31, and when the record command signal CRi has a level representing a logic "1", the process advances to step 34.

In the step 34, the starting address data SSi is selected. The starting address data SSi are loaded in an address counter (not shown) contained in the control unit 20, in step 35, and the address counter is caused to start counting to produce the address data DRS increasing one by one from the starting address data SSi, in step 36.

After that, the flag Fc is set to represent a logic "1", in step 37, and the store command signal CWS and the address data DRS obtained from the address counter are supplied to the voice memory device 22, in step 38. Further, the control signal CC is supplied to the voice information data processing portion 10 so as to cause the voice information data processing portion 10 to produce the memorizable voice information data DAi based on the voice information data obtained from A/D:D/A converter Ci. The voice information data DAi which is formed based on the input audio signal Ai from the training apparatus Bi is successively stored in the storing partition Si of the voice memory device 22, in step 39 according to the address data DRS. Then, the process returns to the step 31.

On the other hand, if at step 32 it is determined that the flag Fc represents a logic "1", it is checked whether the record command signal CRi has a level representing a logic "0" or not, in step 40. If not, the process returns to the step 31. If the record command signal CRi does have a level representing a logic "0", the process advances to step 41.

In the step 41, the counting by the address counter is stopped and the final contents of the address data DRS are stored in the memory contained in the control unit 20. Then, in step 42, the final contents of the address data DRS are stored in the storing partition Si' for the address memory device 24 as the terminating address data SEi in addition to the starting address data SSi so as to renew the terminating address data SEi with the final contents of the address data DRS stored in the step 41. After that, the store command signal CWS and the address data DRS obtained from the address counter are no longer supplied to the voice memory device 22, in step 43. Further, the control signal CC is no longer supplied to the voice information data processing portion 10 so that the storing of the memorizable voice information data DAi in the partition Si of the voice memory device 22 is stopped, in step 44. Then, the flag Fc is set to represent "0", in step 45, and the process returns to the step 31.

Program Flow for Reproduction of Stored Voice Data Information

Figure 3:
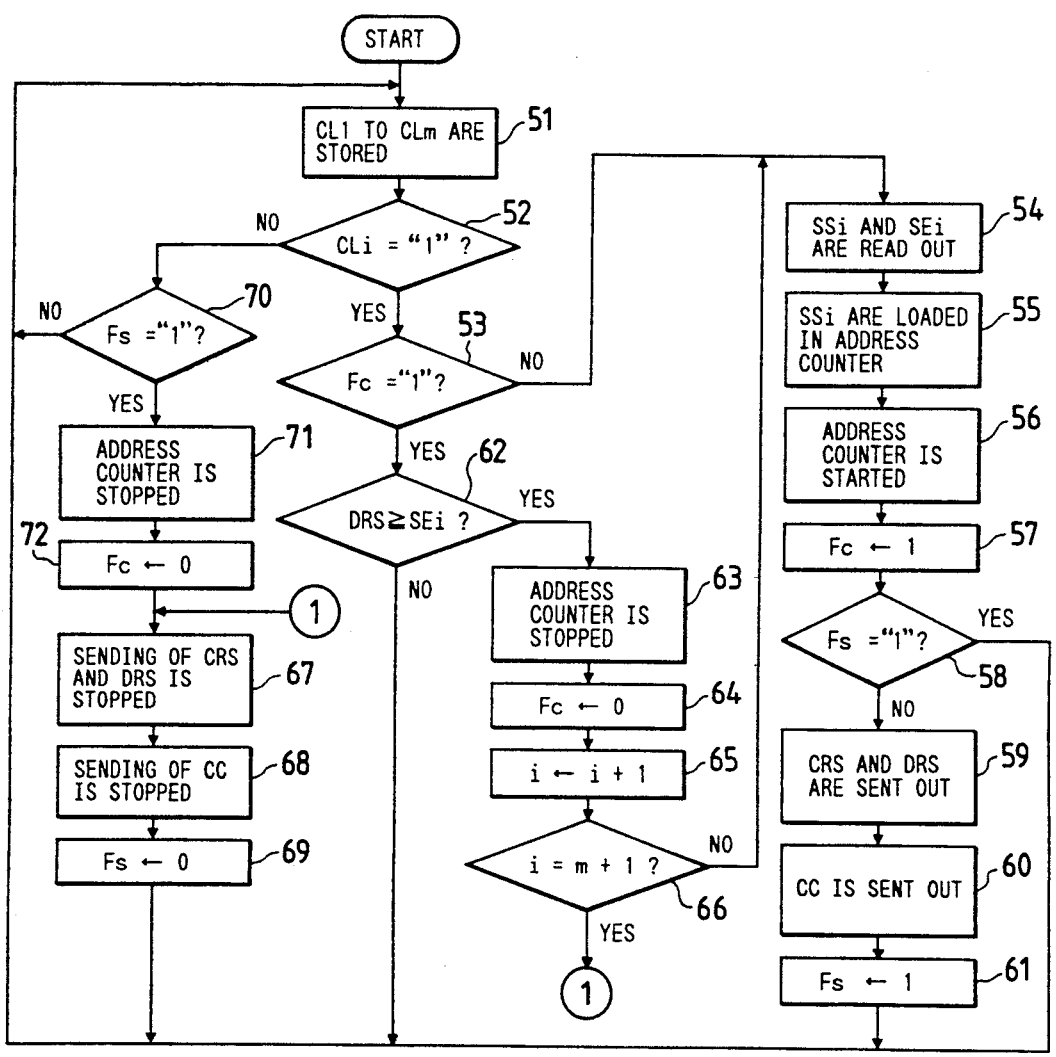
FIG. 3 is a flow chart used for explaining the operation performed by the embodiment shown in FIG. 1 when reproducing the memorized voice data information.

One example of an operation program for performing the control in response to the reproduction command signal CLi having a level representing a logic "1" is carried out in the control unit 20 constituted by the microcomputer in accordance with a flow chart shown in FIG. 3.

First, in step 51, the reproduction command signals CL1 to CLm obtained from the training apparatus B1 to Bm, respectively, are stored in a memory device (not shown) contained in the control unit 20, and then, in step 52, it is checked whether the reproduction command signal CLi has a level representing a logic "1" or not.

If the answer is yes, it is checked whether the flag Fc represents a logic "1" or not, in step 53. If not, the starting address data SSi and the terminating address data SEi are read from the storing partition Si' of the address memory device 24 to be stored in the memory (not shown) contained in the control unit 20, in step 54.

Then, the starting address data SSi is loaded in the address counter (not shown) contained in the control unit 20, in step 55, and the address counter is caused to count and produce the address data DRS increasing one by one from the starting address data SSi, in step 56.

After that, the flag Fc is set to represent a logic "1", in step 57, and it is checked whether a flag Fs represents a logic "1" or not, in step 58. When the flag Fs represents a logic "1", the process returns to the step 51, and when the flag Fs does not represent a logic "1", the read command signal CRS and the address data DRS obtained from the address counter are supplied to the voice memory device 22, in step 59. Further, at step 60 the control signal CC is supplied to the voice information data processing portion 10 so as to cause it to supply the A/D:D/A converter Ci with the voice information data obtained based on the memorized voice information data DAi read from the voice memory device 22. In this way the memorized voice information data DAi are read continuously from the starting end of the storing partition Si of the voice memory device 22, which corresponds to the starting address data SSi. Then, the flag Fs is set to represent a logic "1", in step 61, and the process returns to the step 51.

If it is determined in the step 53 that the flag Fc represents a logic "1", it is checked in step 62 whether or not the contents of the address data DRS supplied to the voice memory device 22 have reached the terminating address data SEi which was stored in the memory in the step 54. When the contents of the address data DRS have not reached the terminating address data SEi, the process returns to the step 51, and when the contents of the address data DRS have reached the terminating address data SEi, the process advances to step 63.

In step 63, the counting of the address counter is stopped. Then, the flag Fc is set to represent a logic "0", in step 64, a counting pointer "i" is increased by 1, in step 65, and the process advances to step 66.

In the step 66, it is checked whether the counting pointer "i" has reached "m+1" or not. As a result, when the counting pointer "i" has not reached "m+1" but is smaller than "m+1", the process advances to the step 54 and the step 54 and the steps following to the step 54 are carried out in the manner as described above. When the counting pointer "i" has reached "m+1", the process advances to step 67.

In the step 67, the supply of the read command signal CRS and the address data DRS obtained from the address counter to the voice memory device 22 is stopped. Further, the supply of the control signal CC to the voice information data processing portion 10 is also stopped so that reading of the voice information data DAi from the voice memory device 22 is stopped, in step 68. Then, the flag Fs is set to represent "0", in step 69, and the process returns to the step 51.

Further, if it is determined in the step 52 that the reproduction command signal CLi does not have a level representing a logic "1", it is checked whether the flag Fs represents a logic "1" or not, in step 70. As a result, when the flag Fs does not represent a logic "1", the process returns to the step 51, and when the flag Fs represents a logic "1", the process advances to step 71. In the step 71, the operation of the address counter is stopped, and the flag Fc is set to represent "0", in step 72. After that, the step 67 and the steps following it are carried out in the manner as described above.

Although the present invention has been shown and described with respect to preferred embodiments, various changes and modifications which are obvious to a person skilled in the art to which the invention pertains are deemed to lie within the spirit and scope of the invention.

What is claimed is:

1. A language laboratory system comprising:
    a plurality of m training apparatus, where m is an integer, each provided with an audio signal input portion for producing a separate input audio signal, an audio signal output portion for audibly reproducing an audio output signal, record command signal producing means for producing a record command signal, and reproduction command signal producing means for producing a reproduction command signal;
    voice data producing means, connected to the m training apparatus, for producing separate voice information digital data signals corresponding to input audio signals supplied from the audio signal input portions of the training apparatus;
    voice memory means, connected to the voice data producing means, and having a plurality of storage areas for storing the voice information data obtained from the voice data producing means in separate storage areas corresponding to each of the training apparatus and which are designated by separate address data;
    address data memory means for storing in separate ones of m storage areas thereof, m pairs of starting address data and terminating address data designating respectively starting and terminating ends of each of the storage areas of the voice memory means in which the voice information data are stored;
    memory control means, connected to the address data memory means, the voice memory means, the voice data producing means and the plurality of training apparatus, and operative to store each of the pairs of starting address data and terminating address data in the separate storage areas of the address data memory means in response to each record command signal received from a corresponding one of the training apparatus and to read all of the m pairs of starting address data and terminating address data successively from the storage areas of the address data memory means in response to a reproduction command signal sent from one of the training apparatus and then to read the voice information data stored in all of the storage areas of the voice memory means having the starting and terminating ends thereof designated by the pairs of starting address data and terminating address data read from the storage areas of the address data memory means; and
    audio signal supplying means, connected to the voice data producing means and the memory control means, for producing continuous output audio signals corresponding to each of the voice information data read from the storage areas of the voice memory means and supplying the audio signal output portion of the one training apparatus with the output audio signals produced based on the voice information data.

2. A language laboratory system according to claim 1, wherein each of the voice data producing means and the audio signal supplying means comprises analog to digital and digital to analog converter means for converting the input audio signal into digital form and the output audio signal into analog form.

3. A language laboratory system according to claim 1, wherein:
    the voice memory means includes another set of storage areas each designated by another set of address data for storing teaching aid information data;
    the address data memory means has another set of storage areas for storing pairs of starting address data and terminating address data designating respectively starting and terminating ends of each of the other set of storage areas of the voice memory means in which the teaching aid information data is stored;
    the memory control means is further operative to read the pairs of starting address data and terminating address data successively from the other set of storage areas of the address data memory means in response to a reproduction command signal sent from one of the training apparatus and then to read the teaching aid information data stored in the other set of storage areas of the voice memory means as designated by each of the pairs of starting address data and terminating address data read from the other set of storage areas of the address data memory means; and
    the audio signal supplying means is further operative to produce another output audio signal based on each of the teaching aid information data read from the other set of storage areas of the voice memory means and supplying the audio signal output portions of one or more of the training apparatus with the other output audio signal produced based on the teaching aid information data.

4. A language laboratory system according to claim 1, wherein each of the training apparatus has a microphone which constitutes the audio signal input portion and through which the input audio signal is supplied to the voice data producing means and a headphone which constitutes the audio signal output portion and to which the output audio signal is supplied.

* * * * *